United States Patent
Nicholls et al.

Patent Number: 5,658,040
Date of Patent: Aug. 19, 1997

[54] ENCLOSURE FOR AN OPERATOR HAVING AN ANGLED REAR WINDOW

[75] Inventors: James L. Nicholls, Mr. Zion; Brad F. Adams; John A. Bauler, both of Peoria, all of Ill.

[73] Assignee: Caterpillar, Inc., Peoria, Ill.

[21] Appl. No.: 355,390

[22] Filed: Dec. 13, 1994

[51] Int. Cl.$^6$ ................................................. B62D 33/06
[52] U.S. Cl. .................... 296/190; 296/146.15; 52/204.5
[58] Field of Search ............................. 296/190, 146.15, 296/201, 96.21, 147; 52/204.5, 204.71

[56] References Cited

U.S. PATENT DOCUMENTS

| | | | |
|---|---|---|---|
| D. 248,475 | 7/1978 | Parks et al. | D15/30 |
| D. 259,424 | 6/1981 | Puig | D15/30 |
| 4,082,343 | 4/1978 | Hurt, II et al. | 296/28 C |
| 4,120,527 | 10/1978 | Lawrence | 296/28 C |
| 4,225,176 | 9/1980 | Moser | 296/190 |
| 4,378,856 | 4/1983 | Miller | 296/190 X |
| 4,416,486 | 11/1983 | McNaught et al. | 296/190 X |
| 4,421,188 | 12/1983 | Fredriksen et al. | 296/190 X |
| 4,427,090 | 1/1984 | Fredriksen et al. | 296/190 X |
| 4,512,433 | 4/1985 | van der Lely | 296/190 X |
| 4,515,234 | 5/1985 | Loy et al. | 296/190 X |
| 4,652,043 | 3/1987 | Hurlburt | 296/190 X |
| 4,702,516 | 10/1987 | Martin, Jr. | 296/190 |
| 5,273,340 | 12/1993 | Nelson et al. | 296/190 |

*Primary Examiner*—Wynn E. Wood
*Assistant Examiner*—Yvonne Horton-Richardson
*Attorney, Agent, or Firm*—Robert J. Hampsch

[57] ABSTRACT

Operator enclosures or cabs in many cases have rear windows which are disposed in a generally upright or vertical position. The vertical position of the window reflects the instruments and dash as well as elements disposed forwardly of the cab during operation at night. The enclosure of the present invention includes a rear wall having lower wall portion and a upper wall portion. The upper wall portion is angled rearwardly from its lower edge to its upper edge and includes an opening for a window. A transparent window is sealably mounted in the opening and is thus also angled rearwardly at an angle sufficient to direct the reflection downward out of the operator's line of vision. This permits improved vision for the operator when operating in the dark.

4 Claims, 2 Drawing Sheets

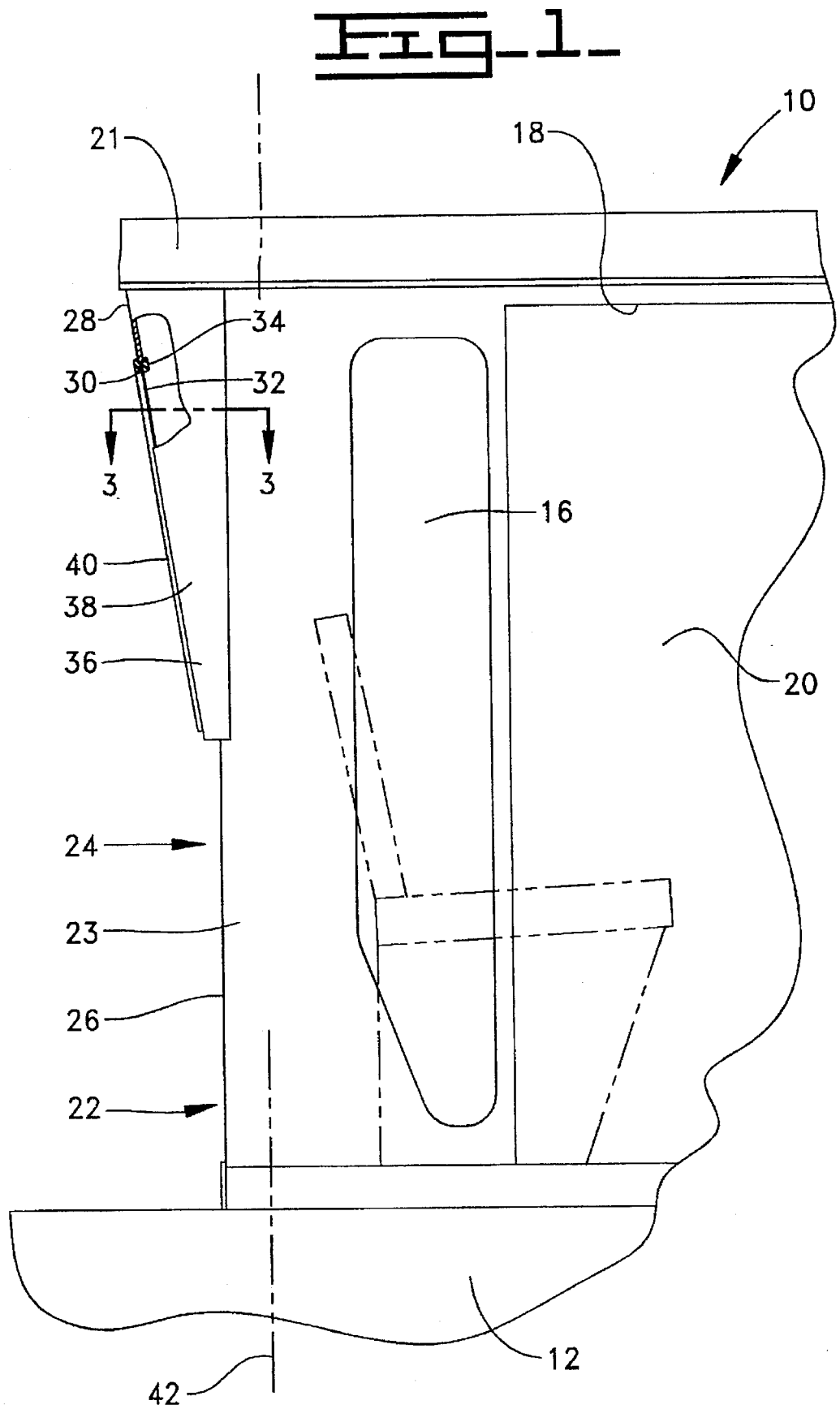

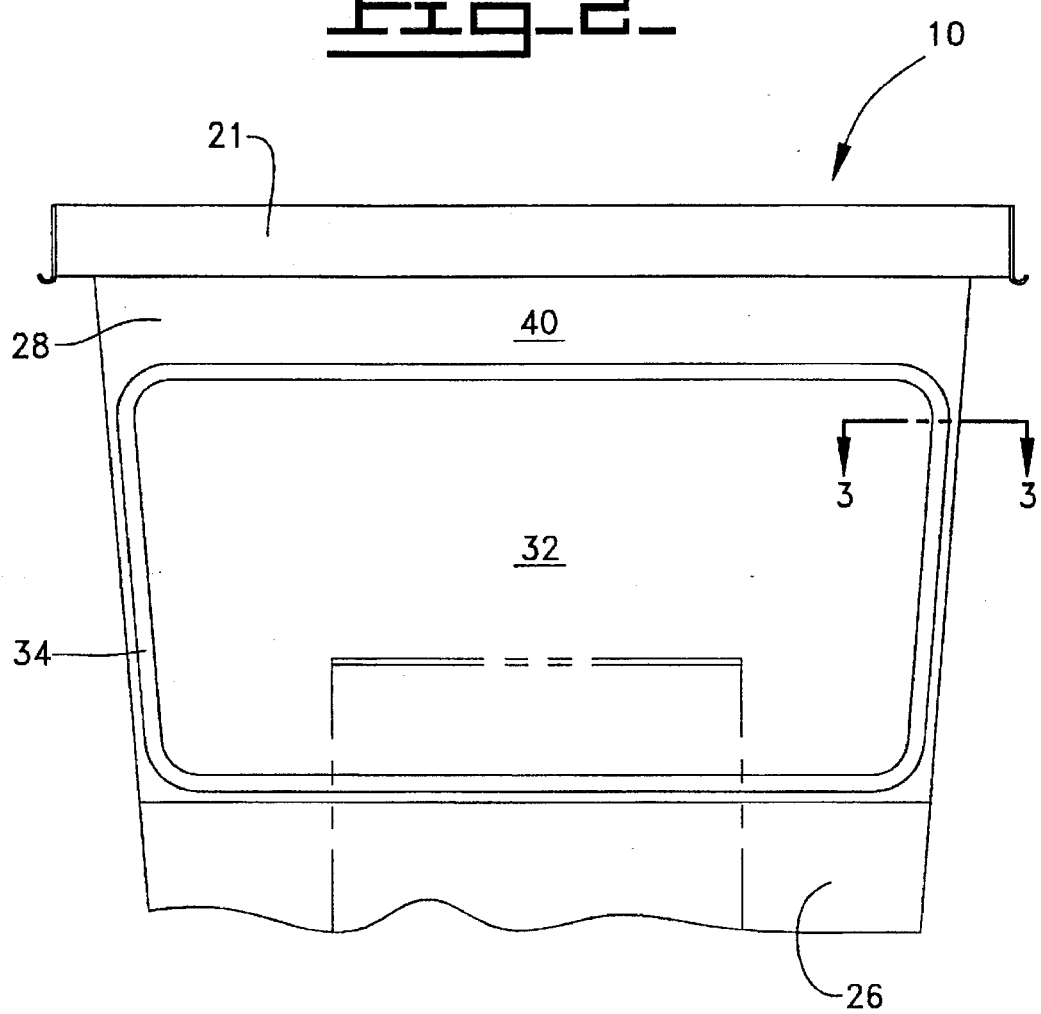
Fig_2_
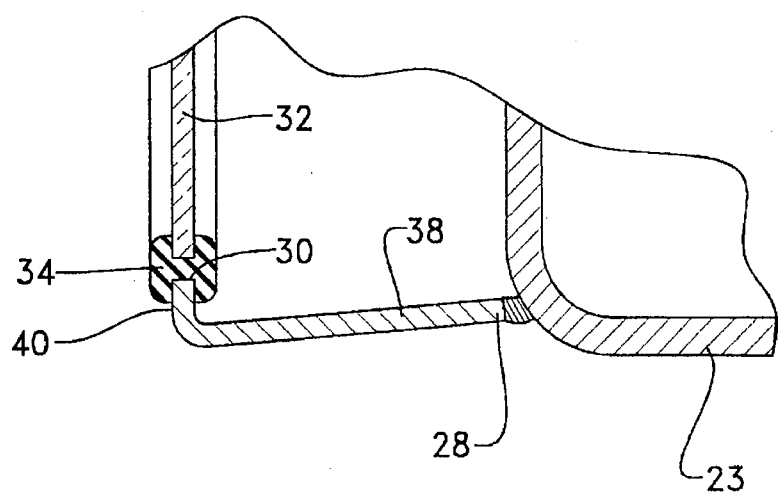
Fig_3_

ENCLOSURE FOR AN OPERATOR HAVING AN ANGLED REAR WINDOW

TECHNICAL FIELD

The present invention relates generally to an enclosure for an operator of equipment such as construction machinery and more particularly to the attitude of a rear window for such enclosure.

BACKGROUND ART

Operator enclosures for heavy equipment normally include windows to provide the operator good vision in all directions while permitting environmental control in the enclosure or cab for operator comfort as desired. In most instances the rear window is disposed substantially vertically in the rear wall of the machine.

The vertical disposition of the window does not create any problems during daylight hours. During night-time operation when the operator needs to see to the rear of the machine the window reflects the interior of the cab and forwardly extending portions of the machine. This seriously affects the ability of the operator to see to the rear of the machine.

In some cabs the rear window is angled forwardly. In those instances as well as those which are substantially vertical there is very little room behind the operator's for storage or hooks for coats or the like. U.S. Pat. No. 5,273,340 issued Dec. 28, 1993, to Peter M. Nelson et.al. and commonly assigned to the assignee of the present application demonstrates this problem.

Accordingly, it is desirable to provide an orientation of the rear window that minimizes reflection during night-time operation. it is also desirable to provide a cab in which sufficient room is provided to permit the operator to hang a coat or other items at the back of the cab without encroaching on his/her space when he/she is seated in the cab.

The present invention is directed to overcoming one or more of the problems as set forth above.

DISCLOSURE OF THE INVENTION

The present invention provides an enclosure or cab including a rear wall having an upper wall portion and a lower wall portion. A window opening is provided in the upper wall portion of the enclosure rear wall. A transparent window is sealably mounted in the opening at a predetermined angle such that the upper edge of the window is further rearwardly than the lower edge thereof.

BRIEF DESCRIPTION OF THE DRAWINGS

For a better understanding of the present invention, reference may be had to the accompanying drawings in which:

FIG. 1 is an elevational, partial side view of an enclosure for an operators station incorporating an embodiment of the present invention.

FIG. 2 is an elevational, partial rear view of the enclosure of FIG. 1.

FIG. 3 is a partial cross-sectional view of the enclosure taken along the line 3—3 of FIG. 2.

BEST MODE FOR CARRYING OUT THE INVENTION

Referring now to the drawings and particularly FIG. 1 an enclosure or cab 10 for the operator's station is secured to a frame 12 of, for example, an earthmoving machine such as a motor grader. The enclosure 10 includes a pair of sidewalls each include appropriate windows 16 and a door opening 18 with a door 20 hingedly connected thereto in a conventional manner.

A rear wall 24 includes a lower wall portion 26 and an upper wall portion 28. The upper wall portion 28 includes an opening 30 having a transparent window 32 sealably mounted therein by a seal 34. The lower wall portion 26 is disposed in a substantially vertical position to provide adequate room in the cab at that level. A roof 21 is disposed over the area bounded by the side and rear walls and a front wall (not shown). The roof and walls are secured to a support structure 22 having a pair of rear uprights 23.

The upper wall portion 28 includes a generally U-shaped member 36 having tapered legs 38 and a bight portion 40. The free ends of the legs 38 are tapered at an angle of substantially 10 degrees with respect to the bight 40 The free ends of the legs 38 of the upper wall portion 28 are individually secured to a respective one of the pair of rear uprights 23 of the support structure 22 such that the bight portion 40 is disposed at an angle of substantially 10 degrees with respect thereto.

The opening 30 and the transparent window 32 are located in the bight portion of the U-shaped member 36. This results in the transparent window 32 being angled upwardly and rearwardly from its lower edge at substantially 10 degrees with respect to a vertical plane 42. If the support rear upright is oriented somewhat off of the vertical plane (i.e., angled forwardly) the angle of the free ends of the legs 38 relative to the bight portion 40 may be set to accomplish whatever angle is desired relative to the vertical plane 42. Although the window is angled at approximately 10 degrees relative to the vertical plane in the present application the angle may fall within a range of 7 to 15 degrees based on the specific circumstances of other applications. It is to be understood that the upper portion of the rear uprights 23 may be angled relative to the vertical plane 42 with the upper portion 28 of the rear wall 24 being flat or other suitable shape.

Industrial Applicability

When the operator is operating the machine under night conditions (dark) the rearwardly angled rear window 32 directs the reflection of the components ahead of the operator's seat downward so that it is not visible to the operator. As a result the operator's vision is not hindered by reflection in the rear window.

The rearwardly angled rear window 32 provides additional space behind the operator in the upper corner portions of the enclosure. This space may be utilized for placement of hooks or other devices for hanging coats or other objects.

Other aspects, objects and advantages of the present invention can be obtained from a study of the drawings, the disclosure and the appended claims.

What is claimed is:

1. A cab enclosure for an operator compartment of a construction machine, comprising:

a support structure of a construction machine, said support structure defining a vertical plane;

a rear wall attached to said support structure, said rear wall including an upper wall portion and a lower wall portion;

said lower wall portion of said rear wall disposed substantially parallel to said vertical plane;

said upper wall portion of said rear wall including first and second tapered legs extending upwardly and outwardly relative to said lower wall portion, said outwardly extension being at a prescribed first angle; and said upper wall portion of said rear wall further including a bight portion interposed between said first and second tapered legs, said bight portion including a transparent window attached thereto and extending upwardly and rearwardly relative to said lower wall portion, said rearwardly extension being at a prescribed second angle;

wherein said first angle and said second angle being in the range of 7 to 15 degrees relative to said vertical plane.

2. The cab enclosure of claim 1, wherein said first angle is about 10 degrees.

3. The cab enclosure of claim 1, wherein said second angle is about 10 degrees.

4. The cab enclosure of claim 1, wherein said second angle corresponds to the taper of said first and second tapered legs.

* * * * *